No. 626,633. Patented June 6, 1899.
J. E. ROBINSON.
BICYCLE HANDLE BAR GRIP CLAMP.
(Application filed June 20, 1898.)
(No Model.)
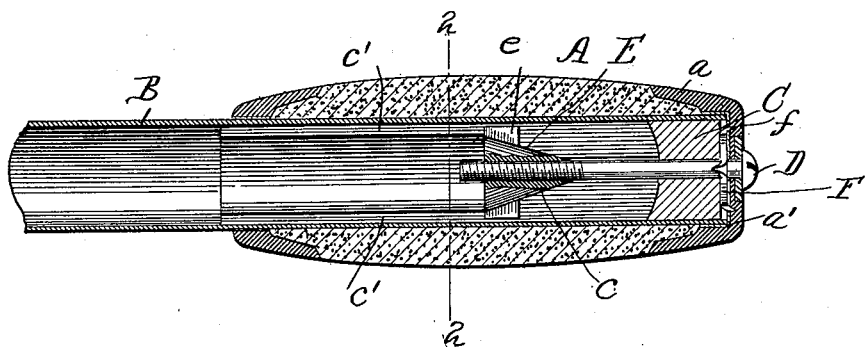
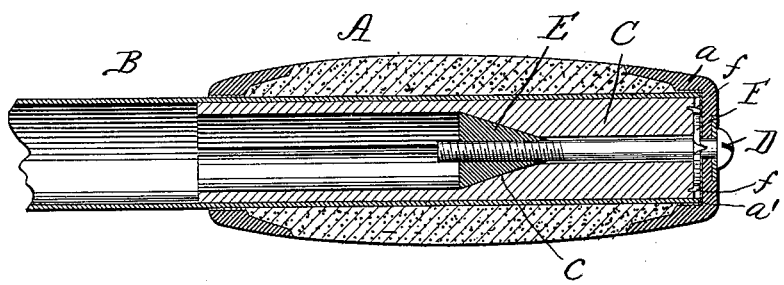
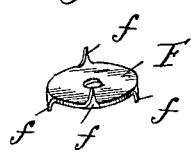
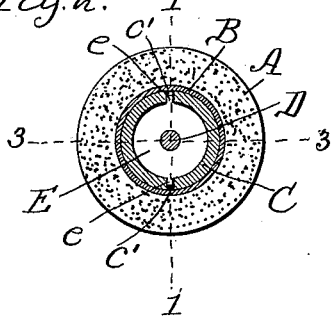
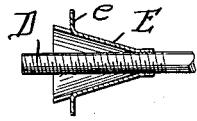
Witnesses:
Wm. M. Rheem
C. F. Munson
Inventor:
James E. Robinson
by Dixon & Fletcher
Attys
THE NORRIS PETERS CO., PHOTO-LITHO., WASHINGTON, D. C.

UNITED STATES PATENT OFFICE.

JAMES E. ROBINSON, OF CHICAGO, ILLINOIS.

BICYCLE HANDLE-BAR-GRIP CLAMP.

SPECIFICATION forming part of Letters Patent No. 626,633, dated June 6, 1899.

Application filed June 20, 1898. Serial No. 683,970. (No model.)

*To all whom it may concern:*

Be it known that I, JAMES E. ROBINSON, of the city of Chicago, county of Cook, and State of Illinois, have invented certain new and useful Improvements in Bicycle Handle-Bar-Grip Clamps, of which the following is a description, reference being had to the accompanying drawings, forming a part of this specification, in which corresponding letters indicate like parts.

The object of my invention is the improvement of such clamps in practical efficiency and durability; and to this end it consists in the combination of elements hereinafter more particularly described and definitely claimed.

In the drawings, Figure 1 is a longitudinal section of my improved grip-clamp. Fig. 2 is a cross-section of the same, taken on the line 2 2 of Fig. 1. Fig. 3 is a longitudinal section taken on the line 3 3 of Fig. 2. Fig. 4 is a perspective view of the locking-washer; and Fig. 5 is a longitudinal section of the expanding-cone, showing a modification.

A is the handle-bar grip mounted upon the end of the handle-bar B. This grip may be of any suitable form and construction. In this case it is provided at its outer end with the usual hard-rubber tip $a$, having upon its inside the soft sheet-metal lining $a'$.

C is a cylinder, of wood or other suitable material, fitting easily within the tube forming the outer end of the handle-bar B. The cylinder C is bored out centrally through a portion of its length, the bore at its inner end being tapered into a cone-like form, as shown at $c$ in the drawings, and thence a smaller passage is bored also centrally through to the other end of the cylinder for the insertion of the screw D. Two or more slits $c'$ are cut longitudinally nearly through the length of the cylinder C.

E is a cone, preferably of metal, which fits within the bore in the cylinder C and is provided with projecting wings $e$, fitting within the slits $c'$, thus preventing the turning of the cone in the cylinder. The cone is also bored out centrally and threaded for the insertion of the screw D.

F is a metallic washer provided with sharp lateral projections $f$, as shown in the drawings.

In assembling the parts the cylinder C is inserted into the grip A, as shown in the drawings, the washer F being interposed between the end of the cylinder and the grip A, and the cone E is dropped into place against the coned portion of the bore, with its wings $e$ fitting within the slits $c'$ in the cylinder C. The screw D is then inserted in its place, as shown in the drawings, and given two or three turns to secure its engagement within the cone E. The tubular end of the handle-bar B is then inserted in the grip A, fitting within the annular space between the cylinder C and the interior of the grip A, as shown in the drawings. The screw D is then brought home by its turning, which forces the sharp projections $f$ upon the washer F into both the grip A and the cylinder C, thus locking them together.

The pressure of the cone E against the coned interior of the slitted cylinder C also expands the cylinder against the interior of the tubular handle-bar B, thus effectually clamping together the grip and the handle-bar. The grip is thus made readily attachable and detachable. A simple modification of the cone E is illustrated in Fig. 5, in which it is shown as made of sheet metal, with prongs $e$ struck outward to fit within the slits $c'$ in the cylinder C.

It is obvious that the form of the washer is immaterial, the important feature being the projections entering both the grip and the cylinder and united so as to be rigid.

Having thus described my invention, what I claim as new, and desire to secure my Letters Patent, is—

A detachable bicycle handle-bar grip, provided with an expanding cylinder, a cone fitting within the same, a screw running through the outer end of the grip into the cone, and a metallic washer interposed between the end of the cylinder and that of the grip, said washer being provided with sharp projections extending in opposite directions parallel or approximately so, with the axis of the grip, whereby, when the screw is tightened, said projections may engage both the cylinder and grip and lock the two together, substantially as and for the purpose set forth.

In testimony whereof I have signed this specification, in the presence of two subscribing witnesses, this 16th day of June, 1898.

JAMES E. ROBINSON.

Witnesses:
 D. H. FLETCHER,
 JOSEPHINE S. MCGREGOR.